T. T. SMITH.
END GATE FASTENING.
APPLICATION FILED MAY 19, 1910.
1,018,453.  Patented Feb. 27, 1912.
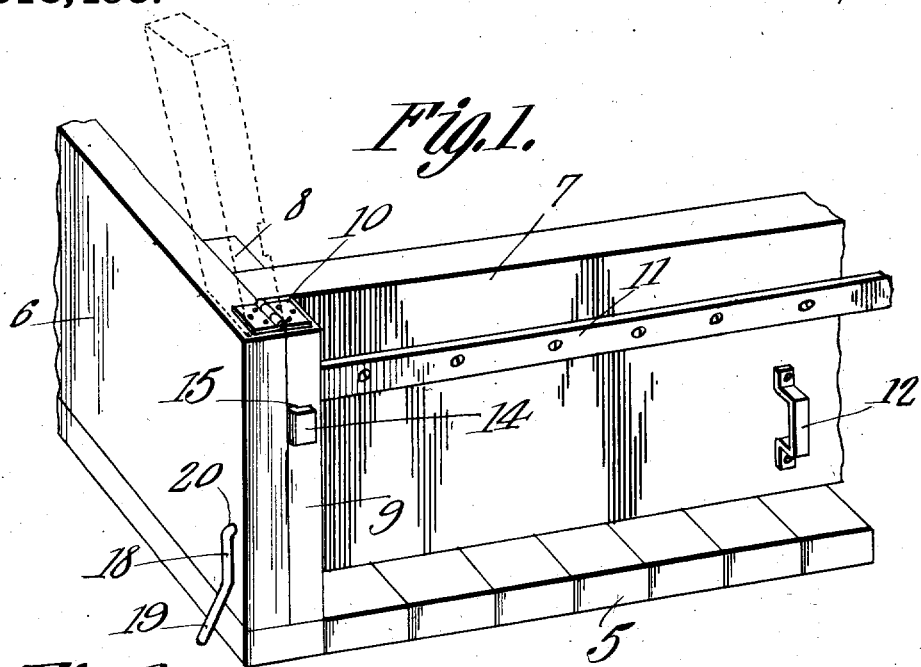
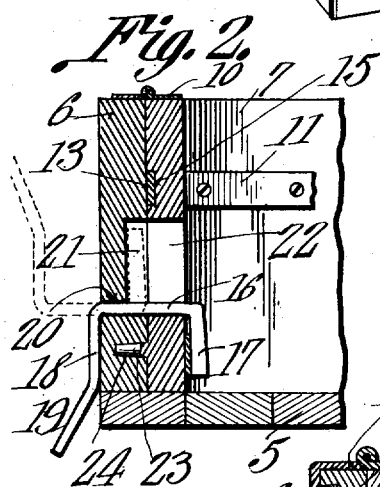
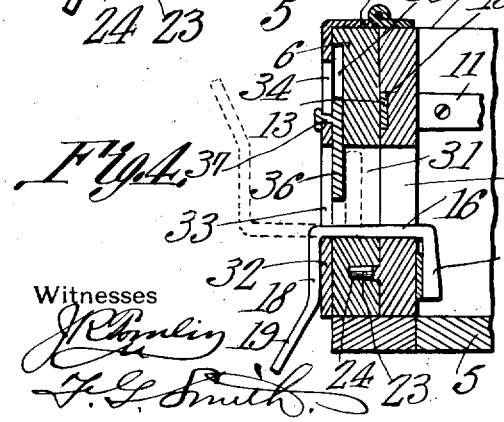
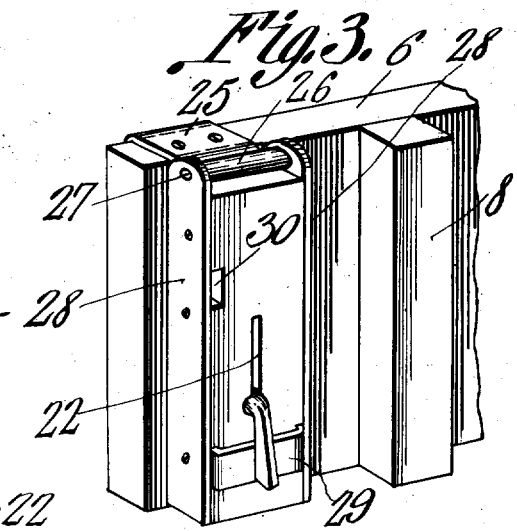
Witnesses
Thomas T. Smith,
Inventor
by C. A. Snow & Co.
Attorneys

UNITED STATES PATENT OFFICE.

THOMAS T. SMITH, OF LOTS CREEK TOWNSHIP, RINGGOLD COUNTY, IOWA.

END-GATE FASTENING.

1,018,453.  Specification of Letters Patent.  Patented Feb. 27, 1912.

Application filed May 19, 1910. Serial No. 562,275.

*To all whom it may concern:*

Be it known that I, THOMAS T. SMITH, a citizen of the United States, residing in Lots Creek township, in the county of Ringgold and State of Iowa, have invented a new and useful End-Gate Fastening, of which the following is a specification.

The object of the present invention is to provide an improved end gate structure and the invention aims primarily to provide a device of the character which cannot become jarred loose and thereby accidentally release the end gate, but which on the other hand will not only hold the end gate against accidentally dropping from the wagon box, but will also hold the same against rattling.

Whereas devices of this class now in use usually engage the end gate only at a single point or at two points at each end thereof, the device of the present invention is so constructed that the end gate will be engaged throughout its entire height at each end and consequently will be more firmly supported.

With the above and other objects in view, the invention consists in the general construction and arrangement of parts shown in the accompanying drawing in which,—

Figure 1 is a perspective view of an end gate embodying the present improvements. Fig. 2 is a vertical transverse sectional view. Fig. 3 is a perspective view showing a slight modification. Fig. 4 is a view similar to Fig. 2 illustrating a slight modification of the invention.

In the drawings, there is shown the rear portion of an ordinary wagon box of which the floor is indicated by the numeral 5 and the sides by the numeral 6, the box being closed at its rear by an end gate 7, which, in itself, does not materially differ from the ordinary end gate now in use. Secured upon the inner face of each side 6 of the wagon box near the rear end thereof is a cleat 8 which is rigid and in mounting the end gate upon the wagon box, the same is disposed at its end against the cleat.

As heretofore stated, it is contemplated in the present invention that means be provided for engaging each end of the end gate throughout the entire height thereof and this means is preferably embodied in cleats which are hingedly or pivotally connected to the side boards 6 at their rear ends and at such distance rearwardly of the cleats 8 as to receive between them and the cleats 8 the ends of the end gate 7 and these last cleats are indicated by the numeral 9 and are of a length equal to the height of the side boards 6 of the wagon box and each of the said cleats is hinged at its upper end as at 10 to the upper edge of a side board 6 as clearly shown in Fig. 1 of the drawing, so that the cleats may be swung down to the position shown in Fig. 1 of the drawings or swung up to dotted line position shown in the said figure depending upon whether or not the end gate is in place against the cleat 8.

It will be observed that there is secured upon the rear face of the end gate 7 a bar 11 which extends lengthwise of the gate in a horizontal plane and at an intermediate point, the end gate is provided with a hand grip 12 which may be grasped for the purpose of removing the end gate or disposing the same in place upon the wagon box. Each end of the bar 11 is extended rearwardly at right angles as at 13 and then extends inwardly laterally as at 14 and each cleat 9 in its outer face is recessed as at 15 so that when the end gate is in position against the cleats 8, and the cleats 9 are swung down to confine the ends of the end gate, the portions 13 of the bar 11 will be received in the recesses 15 in said cleat 9, and the portions 14 of the said bar 11 will engage against the rear edges of the respective cleats 9.

To hold the cleats 9 in their swung-down position, there is provided a latch which will now be described. The latch just mentioned includes a mid-portion 16 which is to serve as a pivot for the latch as will presently be explained, and to one side of this portion there is formed a flattened right angularly extending tongue 17, and to the other side of the said portion 16 there is formed a portion 18 which extends parallel to the opposing edge of the flattened tongue 17 and is thence bent outwardly at an obtuse angle as at 19 so as to afford a handle by means of which the latch may be rotated upon its pivot 16.

For a purpose to be explained, an opening 20 is formed through each side wall 6 of the wagon box at the rear thereof and through this opening is pivotally inserted the portion 16 of the latch just described and this opening 20 communicates with a recess 21 which is formed in the inner face of the said side wall of the box and is of such depth and configuration as to receive the flattened tongue 17 when swung up. Further, each of the cleats 9 is formed with a slot which is indicated by the numeral 22 and is of such length and breadth as to permit of the passage of the tongue 17 therethrough so that when the latches are swung up to the dotted line position shown in Fig. 2 of the drawings and the cleats 9 are swung down, the latches may then be shifted inwardly until their tongues 17 clear the respective slots whereupon the latches may be rocked upon their portions 16 until they assume the full line position shown in the said figure of the drawings, in which position their handles will be presented downwardly and the latches will remain in this position due to gravity as well as due to the fact that their portions 18 and also their edges which oppose the said portions 18 bind against the outer face of the side boards 6 and the inner faces of the cleats 9, respectively, the cleats being in this manner held firmly against the inner faces of the said side boards 6. As a means for positively preventing any front or rear movement of the cleats 9 when in ordinary position, a stud 23 is secured upon each cleat 9 and seats in a socket 24 in the inner face of the respective side board 6.

In the form of the invention shown in the latter figures of the drawings, a wear plate 25 is secured upon the outer face of each side board 6 at the rear end thereof and extends over the upper edge of the said side board and is bent to afford a pintle lug 26 which lug receives a pintle pin 27 secured at its ends in the upper ends of strips 28 secured upon the side edges of the cleats 9. The cleat 9, in this modified form of the invention, also is provided with a wear plate 29 which has its ends secured between the front and rear edges of the said cleat 9 and the strips 28 protecting these edges. Aside from these slight differences, the cleats 9 in both forms are identical in construction although in this latter form it will be readily understood that the portions 14 of the bar 11 will be concealed due to the fact that they will be confined between the rear strips 28 and recesses 30 which are formed in the rear edges of the cleats 9 and are covered by the said rear strips. It will be readily understood of course that the strip 29 protects the cleats 9 against wear by the movement of the tongues 17 thereover when the latches are manipulated. It will be understood of course that any desired hinged connection may be had between the upper ends of the cleats 9 and the upper edges of the side board 6 of the wagon box.

In the form of the invention shown in Fig. 4 of the drawings, the structure is the same as that illustrated in Fig. 2 except that in place of the recess 21 there is bored a slot indicated by the numeral 31 which slot registers with a slot 33 formed in a plate 32 which corresponds to the plate 25 of the form shown in Fig. 3 of the drawings and above this slot 33, the plate 32 is formed with a slot 34, the purpose of which will be presently explained. The outer face of the side board 6 of the wagon body in this form of the invention is formed with a recess 35 in which is slidably disposed a plate 36 having a headed finger 37 to project through the slot 34 in the plate 32 it being preferred that by gravity this plate normally assumes the full line position shown in Fig. 4 of the drawings in which position it partly closes the slot 31 so that the latch member 16 may be swung to the dotted line position and partly withdrawn when it is desired to swing up the cleat 9 and remove the end gate. However, where a scoop board is employed instead of an end gate, the plate 36 may be slid upwardly so as to entirely clear the slot 31 and the slot 33 and the latch member 16 may then be completely withdrawn or removed from the wagon body and no obstruction will be offered to the scoop board when using the same. It will be understood from the foregoing that this latter structure renders the invention adaptable to use either as end gate or scoop board in one and the same wagon body.

What is claimed is:—

A structure of the character described, including the side-boards of a wagon-body having fixed cleats therein, an end-gate engaging said cleats, a cleat hinged at its upper end to the upper edge of each side-board to adapt it to be swung vertically, a leaf of the hinge connection for said cleat having a slot therein, and means for holding the hinged cleats in effective position with respect to said end-gate, comprising a substantially U-shaped latch, one of said hinged cleats and the opposed side-board being provided with registering openings, said latch having its horizontal portion received within and adapted to pivot upon the bottom walls of said openings, the arms of said latch being adapted to subject said cleat and the wagon-body to a clamping action, and a slidable plate having a headed finger received within the slot of said cleat hinge-connection, said slidable plate being adapted to partially close the opening in the wagon body.

In testimony that I claim the foregoing as my own, I have hereto affixed my signature in the presence of two witnesses.

THOMAS T. SMITH.

Witnesses:
ALBERT CASADY,
LEWIS E. CASADY.

Copies of this patent may be obtained for five cents each, by addressing the "Commissioner of Patents, Washington, D. C."